United States Patent
Joe et al.

(10) Patent No.: US 11,934,950 B2
(45) Date of Patent: Mar. 19, 2024

(54) APPARATUS AND METHOD FOR EMBEDDING SENTENCE FEATURE VECTOR

(71) Applicant: SAMSUNG SDS CO., LTD., Seoul (KR)

(72) Inventors: Seong Ho Joe, Seoul (KR); Young June Gwon, Seoul (KR); Seung Jai Min, Seoul (KR); Ju Dong Kim, Seoul (KR); Bong Kyu Hwang, Seoul (KR); Jae Woong Yun, Seoul (KR); Hyun Jae Lee, Seoul (KR); Hyun Jin Choi, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 651 days.

(21) Appl. No.: 17/080,351

(22) Filed: Oct. 26, 2020

(65) Prior Publication Data

US 2021/0319260 A1 Oct. 14, 2021

(30) Foreign Application Priority Data

Apr. 14, 2020 (KR) .................. 10-2020-0045567
Oct. 12, 2020 (KR) .................. 10-2020-0130918

(51) Int. Cl.
| | | |
|---|---|---|
| G06N 3/08 | (2023.01) |
| G06F 18/213 | (2023.01) |
| G06N 3/045 | (2023.01) |
| G06N 20/20 | (2019.01) |
| G06F 18/22 | (2023.01) |

(52) U.S. Cl.
CPC ............ *G06N 3/08* (2013.01); *G06F 18/213* (2023.01); *G06N 3/045* (2023.01); *G06N 20/20* (2019.01); *G06F 18/22* (2023.01)

(58) Field of Classification Search
CPC .......... G06N 20/20; G06N 3/045; G06N 3/08; G06F 18/213; G06F 18/22
See application file for complete search history.

(56) References Cited

PUBLICATIONS

Lan et al., ALBERT: A Lite BERT for Self-Supervised Learning of Language Representations, Feb. 2020. (Year: 2020).*
Hughes et al., Medical Text Classification Using Convolutional Neural Networks, Apr. 2017. (Year: 2017).*
(Continued)

*Primary Examiner* — Marshall L Werner
(74) *Attorney, Agent, or Firm* — Sughrue Mion, PLLC (57) ABSTRACT

An apparatus for embedding a sentence feature vector according to an embodiment includes a sentence acquisitor configured to acquire a first sentence and a second sentence, each including one or more words; a vector extractor configured to extract a first feature vector corresponding to the first sentence and a second feature vector corresponding to the second sentence by independently inputting each of the first sentence and the second sentence into a feature extraction network; and a vector compressor configured to compress the first feature vector and the second feature vector into a first compressed vector and a second compressed vector, respectively, by independently inputting each of the first feature vector and the second feature vector into a convolutional neural network (CNN)-based vector compression network.

8 Claims, 8 Drawing Sheets

(56) References Cited

PUBLICATIONS

Reimers et al., Sentence-BERT: Sentence Embeddings Using Siamese Bert-Networks, Aug. 2019. (Year: 2019).*
Wang et al., The Classification of Chinese Sensitive Information Based on Bert-CNN, ISICA 2019: Artificial Intelligence Algorithms and Applications, Nov. 2019. (Year: 2019).*

* cited by examiner

APPARATUS AND METHOD FOR EMBEDDING SENTENCE FEATURE VECTOR

CROSS REFERENCE TO RELATED APPLICATIONS AND CLAIM OF PRIORITY

This application claims the benefit of Korean Patent Application Nos. 10-2020-0045567 filed on Apr. 14, 2020 and 10-2020-0130918 filed on Oct. 12, 2020 in the Korean Intellectual Property Office, the disclosure of which is incorporated herein by reference in its entirety.

TECHNICAL FIELD

Disclosed embodiments relate to a technique for embedding a feature vector representing a characteristic of a sentence.

BACKGROUND ART

In recent years, due to the advancement of artificial intelligence (AI) in the field of natural language processing, several natural language models that perform embedding at the word level have been released.

However, in order to provide meaningful services using natural language processing, tasks, such as machine reading comprehension and semantic textual similarity, must be effectively performed. However, there is a limitation in processing such tasks with only word-level embedding.

In order to overcome this drawback, several network architectures that can perform embedding at the sentence level have been proposed. However, since a significant amount of time and resources are required for training, it is difficult for service providers involved in natural language processing to use the network architecture individually.

SUMMARY

The disclosed embodiments are intended to perform embedding feature vectors at the sentence level with a relatively small amount of time and few resources.

According to an disclosed embodiment, a method of embedding a sentence feature vector, which is performed by a computing device comprising one or more processors and a memory in which one or more programs to be executed by the one or more processors are stored, includes acquiring a first sentence and a second sentence, each including one or more words; extracting a first feature vector corresponding to the first sentence and a second feature vector corresponding to the second sentence by independently inputting each of the first sentence and the second sentence into a feature extraction network; and compressing the first feature vector and the second feature vector into a first compressed vector and a second compressed vector, respectively, by independently inputting each of the first feature vector and the second feature vector into a convolutional neural network (CNN)-based vector compression network.

The feature extraction network may include a Siamese network architecture composed of a first feature extraction network configured to receive the first sentence and extract the first feature vector and a second feature extraction network configured to receive the second sentence and extract the second feature vector and the vector compression network may include a Siamese network architecture composed of a first vector compression network configured to receive the first feature vector and compress the first feature vector into the first compressed vector and a second vector compression network configured to receive the second feature vector and compress the second feature vector into the second compressed vector.

The feature extraction network may be an ALBERT (A Lite BERT (Bidirectional Encoder Representations from Transformers))-based feature extraction network.

The vector compression network may include a plurality of convolution filters configured to reduce a dimension of input feature vector, an activation function application unit configured to generate activation vectors by applying a predetermined activation function to feature vectors with a reduced dimension, and a pooling layer configured to perform pooling based on a depth between the generated activation vectors.

The vector compression network may include a plurality of sub-networks in which the plurality of convolution filters, the activation function application unit, and the pooling layer are stacked in sequence.

Each of the plurality of convolution filters may have a size of N*1 (N is a natural number).

The pooling layer may perform max pooling between the generated activation vectors.

According to a disclosed embodiment, an apparatus for embedding a sentence feature vector includes a sentence acquisitor configured to acquire a first sentence and a second sentence, each including one or more words; a vector extractor configured to extract a first feature vector corresponding to the first sentence and a second feature vector corresponding to the second sentence by independently inputting each of the first sentence and the second sentence into a feature extraction network; and a vector compressor configured to compress the first feature vector and the second feature vector into a first compressed vector and a second compressed vector, respectively, by independently inputting each of the first feature vector and the second feature vector into a convolutional neural network (CNN)-based vector compression network.

The feature extraction network may include a Siamese network architecture composed of a first feature extraction network configured to receive the first sentence and extract the first feature vector and a second feature extraction network configured to receive the second sentence and extract the second feature vector and the vector compression network may include a Siamese network architecture composed of a first vector compression network configured to receive the first feature vector and compress the first feature vector into the first compressed vector and a second vector compression network configured to receive the second feature vector and compress the second feature vector into the second compressed vector.

The feature extraction network is an ALBERT-based feature extraction network.

The vector compression network may include a plurality of convolution filters configured to reduce a dimension of input feature vector, an activation function application unit configured to generate activation vectors by applying a predetermined activation function to feature vectors with a reduced dimension, and a pooling layer configured to perform pooling based on a depth between the generated activation vectors.

The vector compression network may include a plurality of sub-networks in which the plurality of convolution filters, the activation function application unit, and the pooling layer are stacked in sequence.

Each of the plurality of convolution filters may have a size of N*1 (N is a natural number).

The pooling layer may perform max pooling between the generated activation vectors.

According to the disclosed embodiments, a sentence feature vector is extracted using an ALBERT (A Lite BERT)-based feature extraction network that is structurally lightweight compared to a conventional sentence feature vector extraction network, and thus it is possible to significantly save the time and resources required for training a feature extraction network.

In addition, according to the disclosed embodiments, by using a convolutional neural network (CNN)-based vector compression network to compress an extracted sentence feature vector, an important characteristic of the sentence may be made more distinctive even after compression, compared to the conventional compression technique.

DETAILED DESCRIPTION

Hereinafter, specific exemplary embodiments of the present disclosure will be described with reference to the drawings. The following detailed description is provided to assist in comprehensive understanding of methods, apparatuses, and/or systems described herein. However, this is merely an example, and the present disclosure is not limited thereto.

When detailed description of known art related to the present disclosure is determined to unnecessarily obscure the subject matter of the present disclosure in describing exemplary embodiments of the present disclosure, the detailed description will be omitted. The terms to be described below are terms defined in consideration of functions in the present disclosure and may be changed according to an intention of a user or an operator or practice. Therefore, definitions thereof will be determined based on content of the entire specification. The terms used in the detailed description are merely intended to describe the exemplary embodiments of the present disclosure and should not be limited in any way. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, operations, elements, and/or components, but do not preclude the presence or addition of one or more other features, integers, operations, operations, elements, components, and/or groups thereof.

In the following embodiments, "embedding" refers to a result of converting natural language used by humans into a vector that can be understood by a machine, such as a computing device, or a series of procedures for conversion, in the field of natural language processing. Since there have been difficulties in expressing a contextual meaning or a difference between homophones according to the arrangement or order among words with only word-level embedding, attention is increasingly paid to embedding at the sentence level that allows this.

Figure 1:
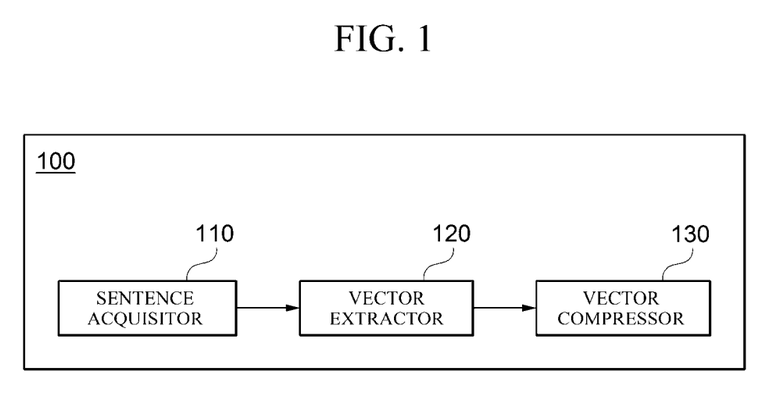
FIG. 1 is a block diagram illustrating an apparatus for embedding a sentence feature vector according to an embodiment.

FIG. 1 is a block diagram illustrating an apparatus 100 for embedding a sentence feature vector according to an embodiment.

As shown, the apparatus 100 for embedding a sentence feature vector according to an embodiment includes a sentence acquisitor 110, a vector extractor 120, and a vector compressor 130.

The sentence acquisitor 110 acquires a first sentence and a second sentence, each including one or more words.

In this case, the first sentence and the second sentence acquired by the sentence acquisitor 110 mean two sentences to be compared for similarity, which may be training data previously stored in a database (not shown) separately provided inside or outside of the apparatus 100 in the case of a training process for sentence similarity comparison or may be sentences input by a user in the case of an execution process for sentence similarity comparison.

The vector extractor 120 independently inputs each of the acquired first sentence and the second sentence into a feature extraction network to extract a first feature vector corresponding to the first sentence and a second feature vector corresponding to the second sentence.

According to an embodiment, the feature extraction network may include a Siamese network composed of a first feature extraction network and a second feature extraction network.

In other words, each of the first feature extraction network and the second feature extraction network has the same or similar arrangement and functions of layers constituting the network, and the feature extraction networks may receive different sentences.

Specifically, the first feature extraction network may extract the first feature vector by receiving the first sentence acquired by the sentence acquisitor 110, and the second feature extraction network may extract the second feature vector by receiving the second sentence acquired by the sentence acquisitor 110.

According to one embodiment, each of the first feature extraction network and the second feature extraction network may include a deep learning-based neural network architecture, and accordingly, update predefined training parameters in the process of training process for sentence similarity comparison and extract a feature vector of an input sentence based on the updated training parameters in the execution process for sentence similarity comparison. In this regard, a description will be given with reference to FIGS. 2 and 3 hereinafter.

According to an embodiment, the feature extraction network may be an A Lite BERT (ALBERT)-based feature extraction network.

Originally, BERT (Bidirectional Encoder Representations from Transformers) refers to a pre-trained language representation model that is bidirectionally trained on the relationship between words constituting a sentence, and may be unsupervised trained by predicting some hidden words among the words constituting a sentence or by matching whether the sentence following one sentence is the correct sentence in order.

However, the BERT has the following limitations as the model size increases.

(1) Memory limitation: When the size of the model is larger than the amount of memory of a computing device, an out-of-memory (OOM) phenomenon occurs during model training.

(2) Training time: Due to too many training parameters, it takes an excessive amount of time to train.

(3) Memory degradation: When the number of layers or a hidden size value in the model increases by more than a certain amount, the performance of the model degrades.

Accordingly, the aforementioned ALBERT is proposed to save time and resources for training by reducing the size of the BERT model to lighten the overall structure.

Specifically, ALBERT may have a smaller size than BERT by reducing the number of training parameters of an input layer and sharing the same training parameters between layers constituting a transformer in the model.

Meanwhile, in the case of an average pooling technique used to compress a feature vector extracted by the conventional BERT, it is not suitable for robustly maintaining an important characteristic of the sentence that the feature vector has, and when it is used to compress the feature vector extracted by the ALBERT, there is a problem that the accuracy of the ALBERT is deteriorated. To overcome such drawbacks, a vector compression network with a new structure to be described below may be proposed.

The vector compressor 130 may compress the first feature vector and the second feature vector into a first compressed vector and a second compressed vector by independently inputting each of the extracted first and second feature vectors into a convolutional neural network (CNN)-based vector compression network to provide a first feature vector and a second feature.

According to an embodiment, the vector compression network may include a Siamese network composed of a first vector compression network and a second vector compression network.

In other words, each of the first vector compression network and the second vector compression network has the same or similar arrangement and functions of layers constituting the network, and the vector compression networks may receive different feature vectors.

Specifically, the first vector compression network may receive the first feature vector extracted by the vector extractor 120 and compress the received first feature vector into the first compressed vector, and the second vector compression network may receive the second feature vector extracted by the vector extractor 120 and compress the received second feature vector into the second compressed vector.

According to an embodiment, the vector compression network may include a plurality of convolution filters, an activation function application unit, and a pooling layer.

Specifically, the plurality of convolution filters may reduce a dimension of the feature vector input to the vector compression network, the activation function application unit may generate activation vectors by applying a predetermined activation function to the feature vectors with the reduced dimension, and the pooling layer may perform pooling based on a depth between the generated activation vectors.

More specifically, each of the plurality of convolution filters may be a filter having a size of N*1 (N is a natural number). Here, N denotes the number of rows of a two-dimensional filter and 1 denotes the number of columns.

According to an embodiment, element values constituting each of the plurality of convolution filters may be zero or a randomly selected value among integer values within a predetermined range.

Meanwhile, according to an embodiment, the activation function application unit may apply a predetermined activation function to each element constituting the feature vector with the reduced dimension, and the applied activation function may be one of a sigmoid function, a Tanh function, a ReLU function, a LeakyReLU function, an identity function, and a max-out function, but is not limited thereto.

Meanwhile, according to an embodiment, the pooling layer may perform max pooling between the generated activation vectors.

In the following embodiments, "pooling" refers to a technique for, if there is an activation filter generated through a convolution filter and an activation function, obtaining a vector of a new size by reducing the size of the activation vector.

In addition, in the following embodiments, "max pooling" refers to a technique for comparing elements located at the same two-dimensional coordinates in a plurality of activation vectors based on a depth direction and selecting an element with the maximum value from among them as an element located at coordinates on a compressed vector corresponding to the two-dimensional coordinates.

According to one embodiment, the vector compression network may include a plurality of sub-networks in which a plurality of convolution filters, an activation function application unit, and a pooling layer are stacked in sequence. In this regard, a description will be given with reference to FIG. 4 hereinafter.

In the illustrated embodiment, each of the configurations may have functions and capabilities different from those described hereinafter and additional configurations may be included in addition to the components described herein.

In addition, in one embodiment, the sentence acquisitor 110, the vector extractor 120, and the vector compressor 130 may be implemented using one or more physically separated devices, or by one or more processors or a combination of one or more processors and software, and specific operations thereof may not be clearly distinguished, unlike the illustrated example.

Figure 2:
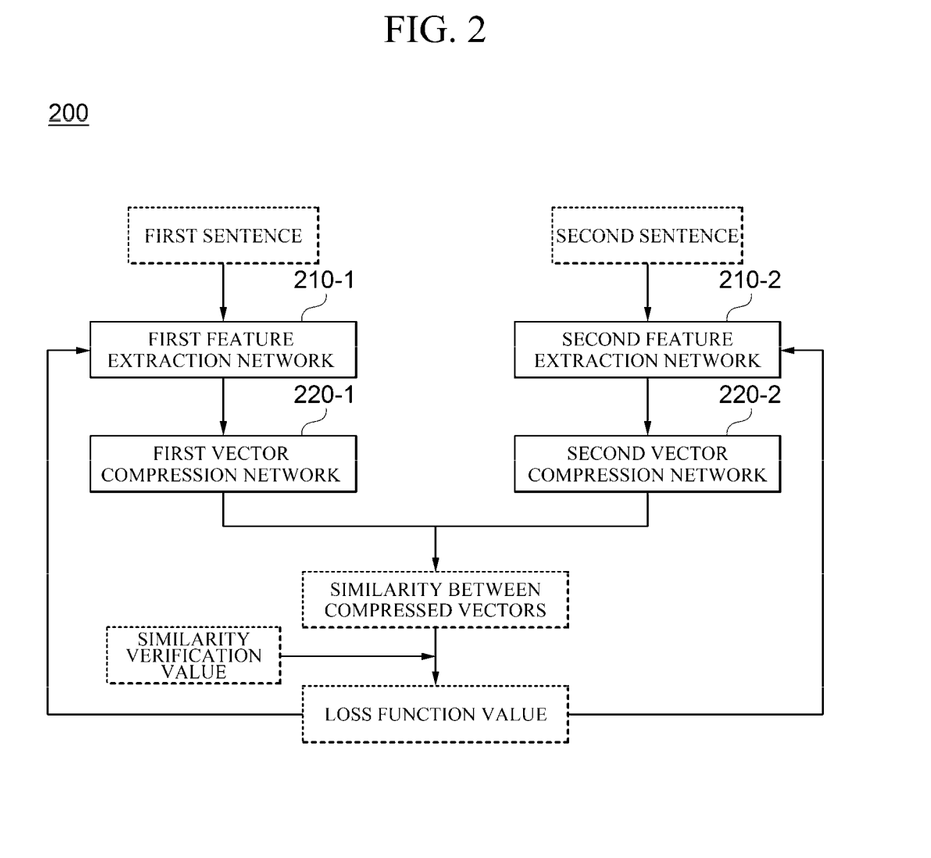
FIG. 2 is an exemplary diagram showing a training process for sentence similarity comparison according to an embodiment.

FIG. 2 is an exemplary diagram 200 showing a training process for sentence similarity comparison according to an embodiment. In the process illustrated in FIG. 2, a series of procedures using a first feature extraction network 210-1, a second feature extraction network 210-2, a first vector compression network 220-1, and a second vector compression network 220-2 may be performed by the above-described apparatus 100 for embedding a sentence feature vector.

As shown in FIG. 2, a first sentence, a second sentence, and a similarity verification value are used as input data for training on sentence similarity comparison.

In this case, the first sentence and the second sentence may be data pre-stored in a storage space separately provided inside or outside of the apparatus 100 for embedding a sentence feature vector, and the similarity verification value is a value that a reviewer determines within a predetermined numerical range by determining a degree of similarity between the pre-stored first and second sentences.

When training starts, the first sentence is input to the first feature extraction network 210-1, and the second sentence is input to the second feature extraction network 210-2.

Thereafter, the first feature extraction network 210-1 extracts a first feature vector that reflects a feature of the first sentence, and the second feature extraction network 210-2 extracts a second feature vector that reflects a feature of the second sentence.

Thereafter, the first feature vector is input to the first vector compression network 220-1 through a predetermined activation function, and the second feature vector is input to the second vector compression network 220-2 through a predetermined activation function.

Thereafter, the first vector compression network 220-1 compresses the first feature vector that has been subjected to the activation function into a first compressed vector, and the second vector compression network 220-2 compresses the second feature vector that has been subjected to the activation function into a second compressed vector.

Thereafter, a predetermined similarity evaluation function may calculate a degree of similarity between the two compressed vectors by using element values of each of the first and second compressed vectors as factors. In this case, the similarity evaluation function may be, for example, a Euclidean distance function, a cosine similarity function, a Jaccard distance function, a Mahalanobis distance function, a Hamming distance function, a Manhattan distance function, or the like, but is not limited thereto.

Thereafter, the calculated degree of similarity between the two compressed vectors and the similarity verification value, which is one of the input data, are compared and a loss function value may be calculated based on a difference between the two values.

Specifically, a loss function value may be calculated by calculating a predefined loss function using the calculated degree of similarity and the similarity verification value as factors. In this case, the loss function is, for example, a mean squared error (MSE) function, a cross entropy function, or the like, but is not limited thereto.

Thereafter, the first feature extraction network 210-1 and the second feature extraction network 210-2 may be trained by updating the training parameters in the direction of decreasing the loss function value until the calculated loss function value becomes smaller than a predetermined threshold value.

Figure 3:
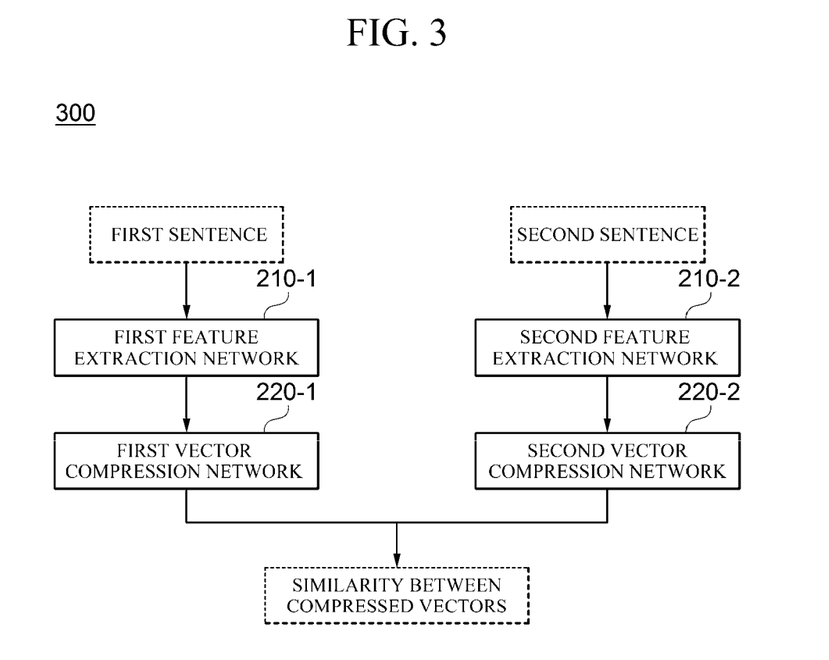
FIG. 3 is an exemplary diagram showing an execution process for sentence similarity comparison according to an embodiment.

FIG. 3 is an exemplary diagram 300 showing an execution process for sentence similarity comparison according to an embodiment. In the process shown in FIG. 3, a series of procedures using the first feature extraction network 210-1, the second feature extraction network 210-2, the first vector compression network 220-1, and the second vector compression network 220-2 may be performed by the above-described apparatus 100 for embedding a sentence feature vector.

As shown in FIG. 3, the first sentence and the second sentence are used as input data for execution of sentence similarity comparison.

In this case, the first sentence and the second sentence are data to be compared for similarity, and may be data obtained from a storage space separately provided inside or outside of the apparatus 100 for embedding a sentence feature vector, or may be data input by a user.

When execution starts, the first sentence is input to the first feature extraction network 210-1, and the second sentence is input to the second feature extraction network 210-2.

Thereafter, the first feature extraction network 210-1 extracts a first feature vector that reflects a feature of the first sentence, and the second feature extraction network 210-2 extracts a second feature vector that reflects a feature of the second sentence.

Thereafter, the first feature vector is input to the first vector compression network 220-1 through a predetermined activation function, and the second feature vector is input to the second vector compression network 220-2 through a predetermined activation function.

Thereafter, the first vector compression network 220-1 compresses the first feature vector that has been subjected to the activation function into a first compressed vector, and the second vector compression network 220-2 compresses the second feature vector that has been subjected to the activation function into a second compressed vector.

Thereafter, a predetermined similarity evaluation function may calculate a degree of similarity between the two compressed vectors by using element values of each of the first and second compressed vectors as factors.

The user may compare the calculated degree of similarity with a predetermined similarity reference value to determine whether the input first and second sentences are similar sentences, and further, the user may use the determination result for a service related to natural language processing.

Figure 4:
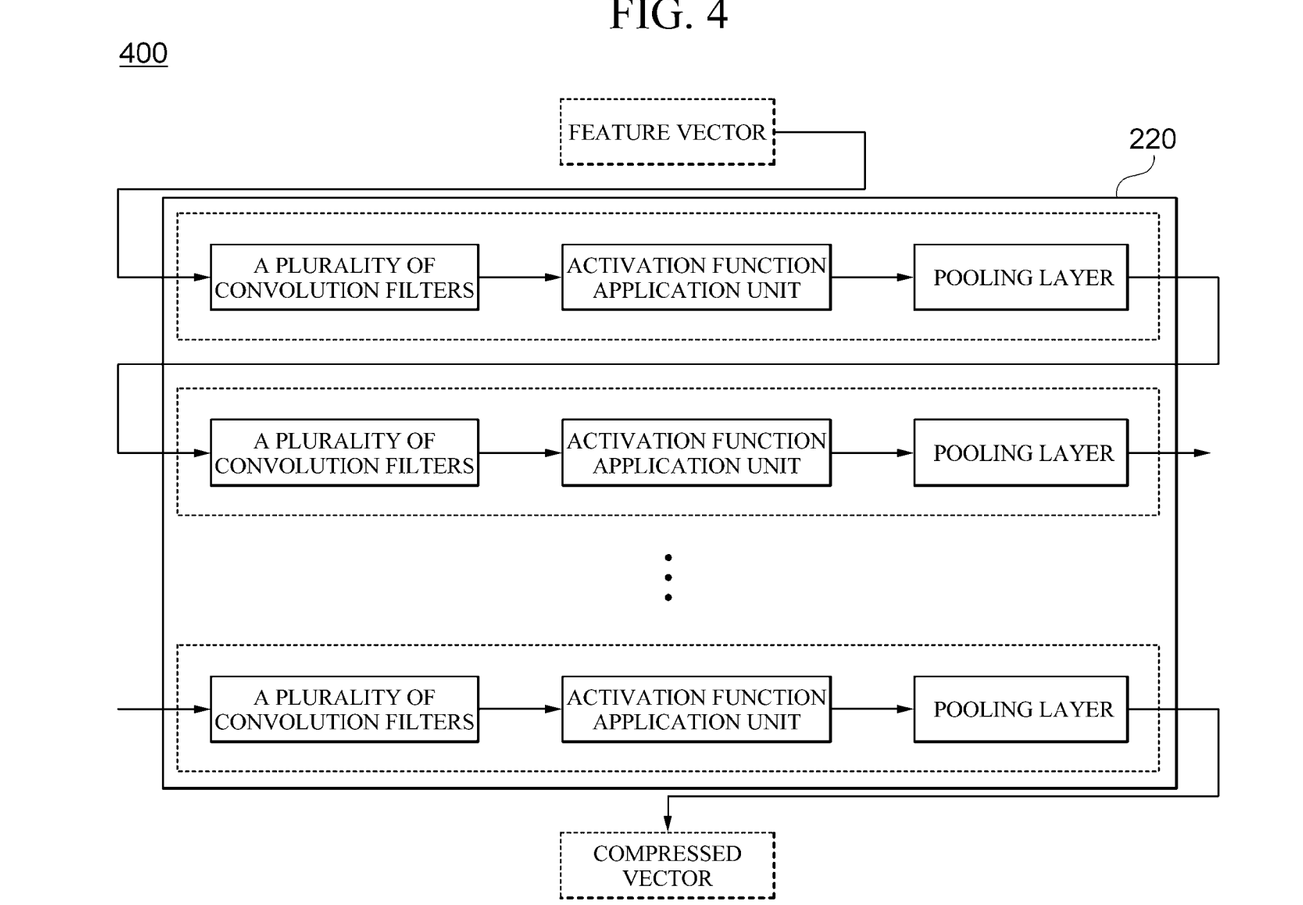
FIG. 4 is a block diagram illustrating in detail a structure of a vector compression network according to an embodiment.

FIG. 4 is a block diagram 400 illustrating in detail a structure of a vector compression network according to an embodiment.

Referring to FIG. 4, a solid-lined box represents a vector compression network 220 that compresses a feature vector into a compressed vector, and dotted-lined boxes repeatedly shown inside the solid-lined box represent sub-networks in each of which a plurality of convolution filters, an activation function application unit, and a pooling layer are stacked in sequence.

Accordingly, it can be seen that an input feature vector is first reduced in two dimensions by the plurality of convolution filters while passing through one sub-network, then some element values thereof are deactivated by the activation function application unit, and the feature vector is reduced once more in the depth direction by the pooling layer.

Then, the compressed vector finally generated by repeating this process is a result of two-dimensional reduction performed several times by a convolution filter having various filter values. Therefore, the compressed vector may robustly maintain the characteristic of an important sentence that the initially input feature vector has.

Figure 5:
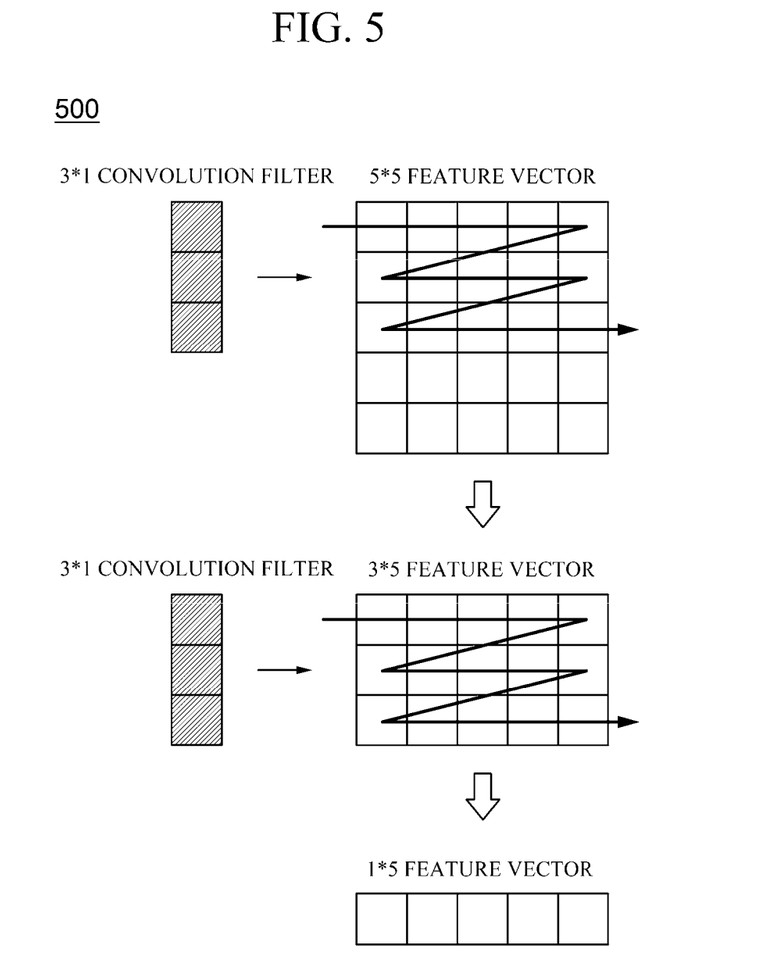
FIG. 5 is an exemplary diagram for explaining a function of a convolution filter according to an embodiment.

FIG. 5 is an exemplary diagram 500 for explaining a function of a convolution filter according to an embodiment.

Referring to FIG. 5, a process of generating a 1*5 feature vector by sequentially reducing a 5*5 feature vector in two dimensions by using a 3*1 convolution filter is shown. First, a 3*1 convolution filter performs convolution with elements on a 5*5 feature vector sequentially along a path on the 5*5 feature vector as shown by a bold arrow. For example, the 3*1 convolution filter initially performs convolution with an element located in the first row, first column, an element located in the second row, first column, and an element located in the third row, first column of the 5*5 feature vector. Then, the 3*1 convolution filter performs convolution with an element located in the first row, second column, an element located in the second row, second column, and an element located in the third row, second column of the 5*5 feature vector.

At this time, the values calculated as the result of the convolution sequentially become values located in the first row, first column, in the first row, second column, . . . and in the third row, fifth column of the 3*5 feature vector shown below.

Thereafter, the 3*1 convolution filter repeats the above process for the 3*5 feature vector, and generates a 1*5 feature vector by two-dimensional reduction of the 3*5 feature vector.

Figure 6:
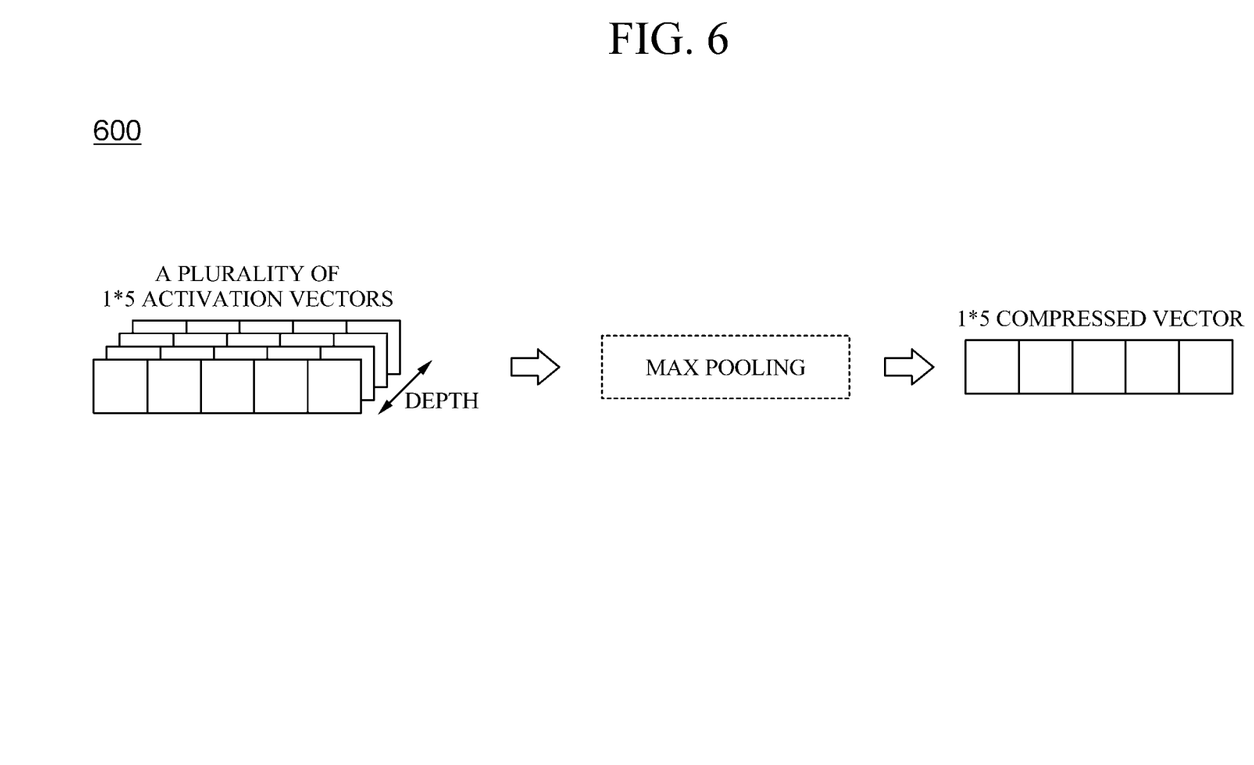
FIG. 6 is an exemplary diagram for explaining a function of a pooling layer according to an embodiment.

FIG. 6 is an exemplary diagram 600 for explaining a function of a pooling layer according to an embodiment.

Referring to FIG. 6, a process of generating a 1*5 compression vector by performing max pooling on a plurality of 1*5 activation vectors generated by using a predetermined activation function is illustrated.

The pooling layer performs max pooling in which elements located in the same row, same column of a plurality of 1*5 activation vectors are compared based on the depth direction and the element with the maximum value is selected as an element in the same row, same column of the 1*5 compression vector.

For example, when the values of the elements located in the first row, first column of each of the plurality of 1*5 activation vectors are "3, 7, 5, and 1", respectively, the pooling layer sets 7, which is the maximum value among them, as a value of an element located in the first row, first column of the 1*5 compression vector.

Figure 7:
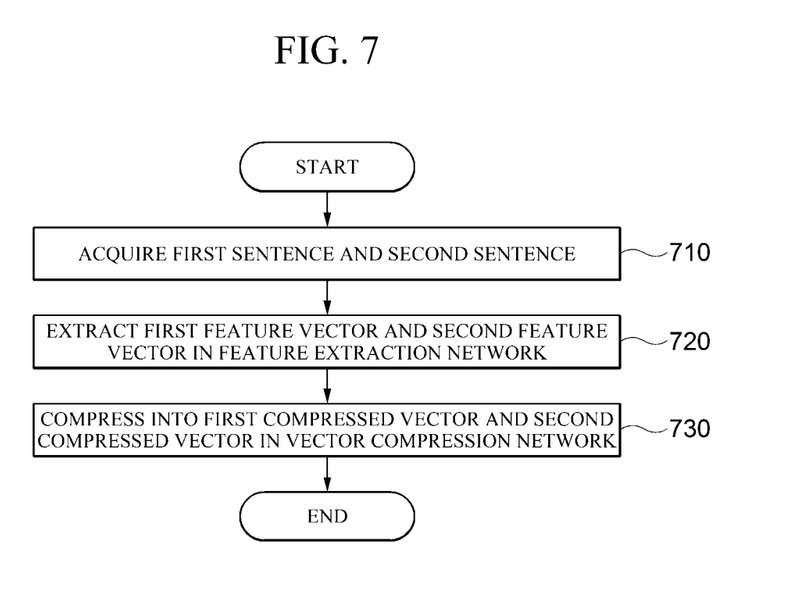
FIG. 7 is a flowchart illustrating a method of embedding a sentence feature vector according to an embodiment.

FIG. 7 is a flowchart illustrating a method of embedding a sentence feature vector according to an embodiment.

The method illustrated in FIG. 7 may be performed by, for example, the apparatus 100 for embedding a sentence feature vector described above.

First, the apparatus 100 for embedding a sentence feature vector acquires a first sentence and a second sentence, each including one or more words (710).

Thereafter, the apparatus 100 for embedding a sentence feature vector independently inputs each of the first sentence and the second sentence into the feature extraction network to extract a first feature vector corresponding to the first sentence and a second feature vector corresponding to the second sentence (720).

Thereafter, the apparatus 100 for embedding a sentence feature vector independently inputs each of the first feature vector and the second feature vector into a convolutional neural network-based vector compression network to compress the first feature vector and the second feature vector into a first compressed vector and a second compressed vector, respectively (730).

In the illustrated flowchart, at least some of the operations may be performed in different order or may be combined into fewer operations or further divided into more operations. In addition, some of the operations may be omitted, or one or more extra operations, which are not illustrated, may be added to the flowchart and be performed.

Figure 8:
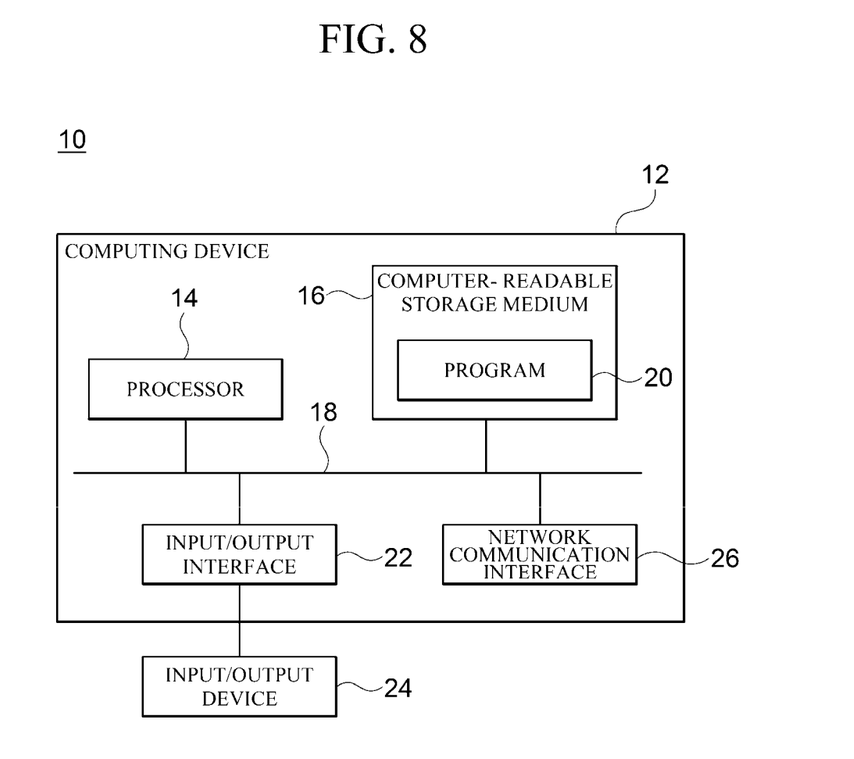
FIG. 8 is a block diagram illustrating an example of a computing environment including a computing device according to an embodiment.

FIG. 8 is a block diagram illustrating an example of a computing environment 10 including a computing device according to an embodiment. In the illustrated embodiment, each of the components may have functions and capabilities different from those described hereinafter and additional components may be included in addition to the components described herein.

The illustrated computing environment 10 includes a computing device 12. In one embodiment, the computing device 12 may be the apparatus 100 for embedding a sentence feature vector.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

Meanwhile, the embodiments of the present disclosure may include a computer readable recording medium including a program for executing methods described in this specification on a computer. The computer readable recording medium may include a program instruction, a local data file, a local data structure, and/or combinations and subcombinations thereof. The medium may be specially designed and constructed for the purpose of the present disclosure, or may be well-known and available to those having skill in the computer software arts. Examples of the computer readable recording medium include magnetic media such as a hard disk, a floppy disk, and a magnetic tape, optical media such as a compact disc read-only memory (CD-ROM) and a digital versatile disc (DVD)-ROM, and a hardware device such as a read only memory (ROM), random-access memory (RAM), and a flash memory, which is specially designed to store and execute program commands. Examples of the program commands include an advanced language code which the computer can execute using an interpreter as well as a machine language code made by compilers.

While the present disclosure has been described in detail above with reference to representative exemplary embodiments, it should be understood by those skilled in the art that the exemplary embodiments may be variously modified without departing from the scope of the present disclosure. Therefore, the scope of the present disclosure is defined not by the described exemplary embodiments but by the appended claims and encompasses equivalents that fall within the scope of the appended claims.

What is claimed is:

1. A method of embedding a sentence feature vector, which is performed by a computing device comprising one or more processors and a memory in which one or more programs to be executed by the one or more processors are stored, the method comprising:
acquiring a first sentence and a second sentence, each including one or more words;
extracting a first feature vector corresponding to the first sentence and a second feature vector corresponding to the second sentence by independently inputting each of the first sentence and the second sentence into a bidirectional encoder representations from transformers (BERT)-based feature extraction network; and
compressing the first feature vector and the second feature vector into a first compressed vector and a second compressed vector, respectively, by independently inputting each of the first feature vector and the second feature vector into a convolutional neural network (CNN)-based vector compression network,
wherein the CNN-based vector compression network comprises:
a plurality of convolution filters configured to reduce a dimension of the first feature vector or the second feature vector that is an input feature vector,
an activation function application unit configured to generate a plurality of 1×N activation vectors by applying a predetermined activation function to feature vectors with a reduced dimension, and
a pooling layer configured to perform max pooling in which a plurality of elements located in a same row and a same column of the plurality of 1×N activation vectors are compared based on a depth direction, and a first element with a maximum value is selected as an element in the same row and the same column of an 1×N compression vector,
wherein N is a natural number,
wherein the plurality of 1×N activation vectors have same sizes of row and columns,
wherein the BERT-based feature extraction network is trained by updating training parameters based on a similarity between the first compressed vector and the second compressed vector,
wherein the BERT-based feature extraction network comprises a Siamese network architecture composed of a first feature extraction network configured to receive the first sentence and extract the first feature vector and a second feature extraction network configured to receive the second sentence and extract the second feature vector,
wherein the CNN-based vector compression network comprises a Siamese network architecture composed of a first vector compression network configured to receive the first feature vector and compress the first feature vector into the first compressed vector and a second vector compression network configured to receive the second feature vector and compress the second feature vector into the second compressed vector, and
wherein the CNN-based vector compression network is separately provided from the BERT-based feature extraction network.

2. The method of claim 1, wherein the BERT-based feature extraction network is an ALBERT (A Lite BERT (Bidirectional Encoder Representations from Transformers))-based feature extraction network.

3. The method of claim 1, wherein the CNN-based vector compression network comprises a plurality of sub-networks in which the plurality of convolution filters, the activation function application unit, and the pooling layer are stacked in sequence.

4. The method of claim 1, wherein each of the plurality of convolution filters has a size of N*1.

5. An apparatus for embedding a sentence feature vector, comprising:
a sentence acquisitor configured to acquire a first sentence and a second sentence, each including one or more words;
a vector extractor configured to extract a first feature vector corresponding to the first sentence and a second feature vector corresponding to the second sentence by independently inputting each of the first sentence and the second sentence into a bidirectional encoder representations from transformers (BERT)-based feature extraction network; and
a vector compressor configured to compress the first feature vector and the second feature vector into a first compressed vector and a second compressed vector, respectively, by independently inputting each of the first feature vector and the second feature vector into a convolutional neural network (CNN)-based vector compression network,
wherein the CNN-based vector compression network comprises:
a plurality of convolution filters configured to reduce a dimension of the first feature vector or the second feature vector that is an input feature vector,
an activation function application unit configured to generate a plurality of 1×N activation vectors by applying a predetermined activation function to feature vectors with a reduced dimension, and
a pooling layer configured to perform max pooling in which a plurality of elements located in a same row and a same column of the plurality of 1×N activation vectors are compared based on a depth direction, and a first element with a maximum value is selected as an element in the same row and the same column of an 1×N compression vector,
wherein N is a natural number,
wherein the plurality of 1×N activation vectors have same sizes of row and columns,
wherein the BERT-based feature extraction network is trained by updating training parameters based on a similarity between the first compressed vector and the second compressed vector,
wherein the BERT-based feature extraction network comprises a Siamese network architecture composed of a first feature extraction network configured to receive the first sentence and extract the first feature vector and a second feature extraction network configured to receive the second sentence and extract the second feature vector,
wherein the CNN-based vector compression network comprises a Siamese network architecture composed of a first vector compression network configured to receive the first feature vector and compress the first feature vector into the first compressed vector and a second vector compression network configured to receive the second feature vector and compress the second feature vector into the second compressed vector, and wherein the CNN-based vector compression network is separately provided from the BERT-based feature extraction network.

6. The apparatus of claim 5, wherein the BERT-based feature extraction network is an ALBERT (A Lite BERT (Bidirectional Encoder Representations from Transformers))-based feature extraction network.

7. The apparatus of claim 5, wherein the CNN-based vector compression network comprises a plurality of sub-networks in which the plurality of convolution filters, the activation function application unit, and the pooling layer are stacked in sequence.

8. The apparatus of claim 5, wherein each of the plurality of convolution filters has a size of N*1.

* * * * *